US006415558B1

(12) United States Patent
Cherry

(10) Patent No.: US 6,415,558 B1
(45) Date of Patent: Jul. 9, 2002

(54) TORNADO SHELTER

(75) Inventor: Charles W. Cherry, Edmond, OK (US)

(73) Assignee: Autoquip Corporation, Guthrie, OK (US)

( * ) Notice: Subject to any disclaimer, the term of this patent is extended or adjusted under 35 U.S.C. 154(b) by 0 days.

(21) Appl. No.: 09/611,307

(22) Filed: Jul. 6, 2000

(51) Int. Cl.[7] .............................. E04H 3/00; E04B 1/92
(52) U.S. Cl. ....................... 52/79.1; 52/167.1; 52/169.6; 52/270; 52/653.1; 52/792.1; 292/138; 292/139
(58) Field of Search ................................ 52/79.1, 79.9, 52/106, 167.1, 169.6, 270, 283, 653.1, 656.4, 792.1; 292/158, 139, 136; 49/501

(56) References Cited

U.S. PATENT DOCUMENTS

| 4,012,871 A | | 3/1977 | Netto |
| 4,126,972 A | | 11/1978 | Silen |
| 4,258,511 A | | 3/1981 | Strian |
| 4,429,495 A | * | 2/1984 | Aoki ............................ 49/501 |
| 4,592,175 A | * | 6/1986 | Werner ........................ 52/79.9 |
| 4,754,584 A | * | 7/1988 | Newton, II ................... 52/106 |
| 5,177,914 A | * | 1/1993 | Hilmer ........................ 52/79.9 |
| 5,472,247 A | * | 12/1995 | Monson ........................ 292/36 |
| 5,481,837 A | | 1/1996 | Minks, Jr. |
| 5,588,269 A | * | 12/1996 | Wagner ........................ 52/270 |
| 5,595,408 A | * | 1/1997 | Jeche ........................... 292/37 |
| 5,603,234 A | * | 2/1997 | Lozier et al. .................. 70/119 |
| 5,813,174 A | | 9/1998 | Waller |
| 5,956,907 A | | 9/1999 | Martin |
| 5,983,578 A | * | 11/1999 | Huttie et al. ................. 52/79.1 |

OTHER PUBLICATIONS

National Performance Criteria for Tornado Shelters, 1st Ed., May 8, 1999 FEMA.
Taking Shelter from the Storm: Building a Safe room Inside Your House, 2nd Ed, Aug. 1999.

* cited by examiner

Primary Examiner—Beth A. Stephan
Assistant Examiner—Brian E. Glessner

(57) ABSTRACT

A Storm Shelter which meets FEMA criteria and can be assembled from the inside, within an existing room of a house. The shelter includes connection members which are not joined to one another at their ends, and panels having C-shaped channel members which have apertures for bolting to the connection members and to each other. A reinforced door formed of a panel having C-shaped channels on its sides is mounted to swing inwardly whereby providing entry and exit.

7 Claims, 3 Drawing Sheets

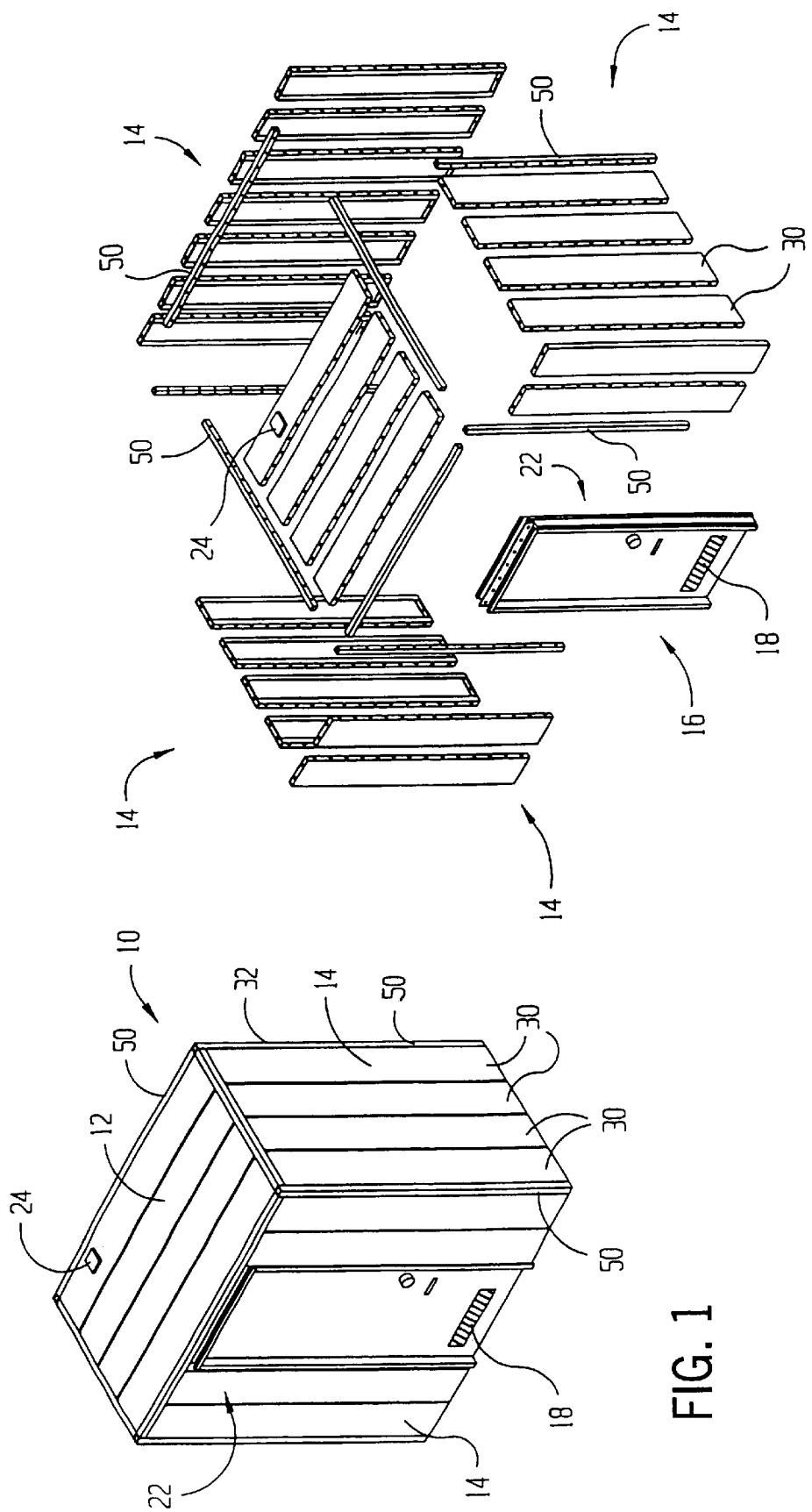

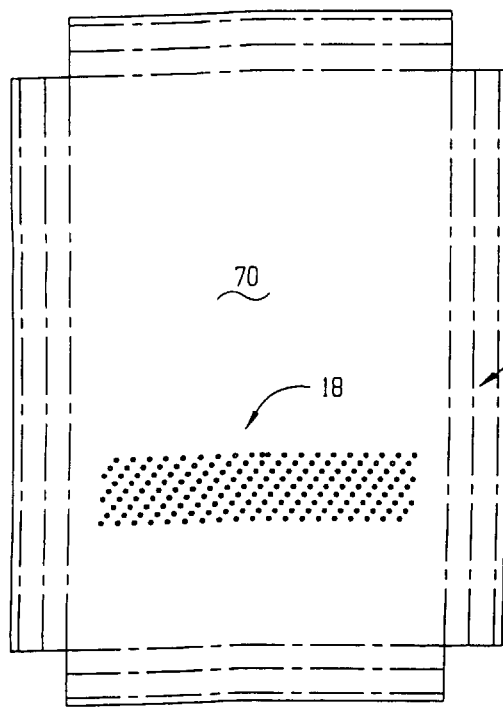
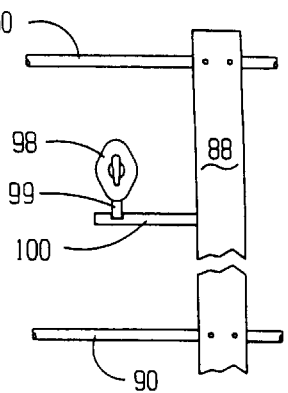
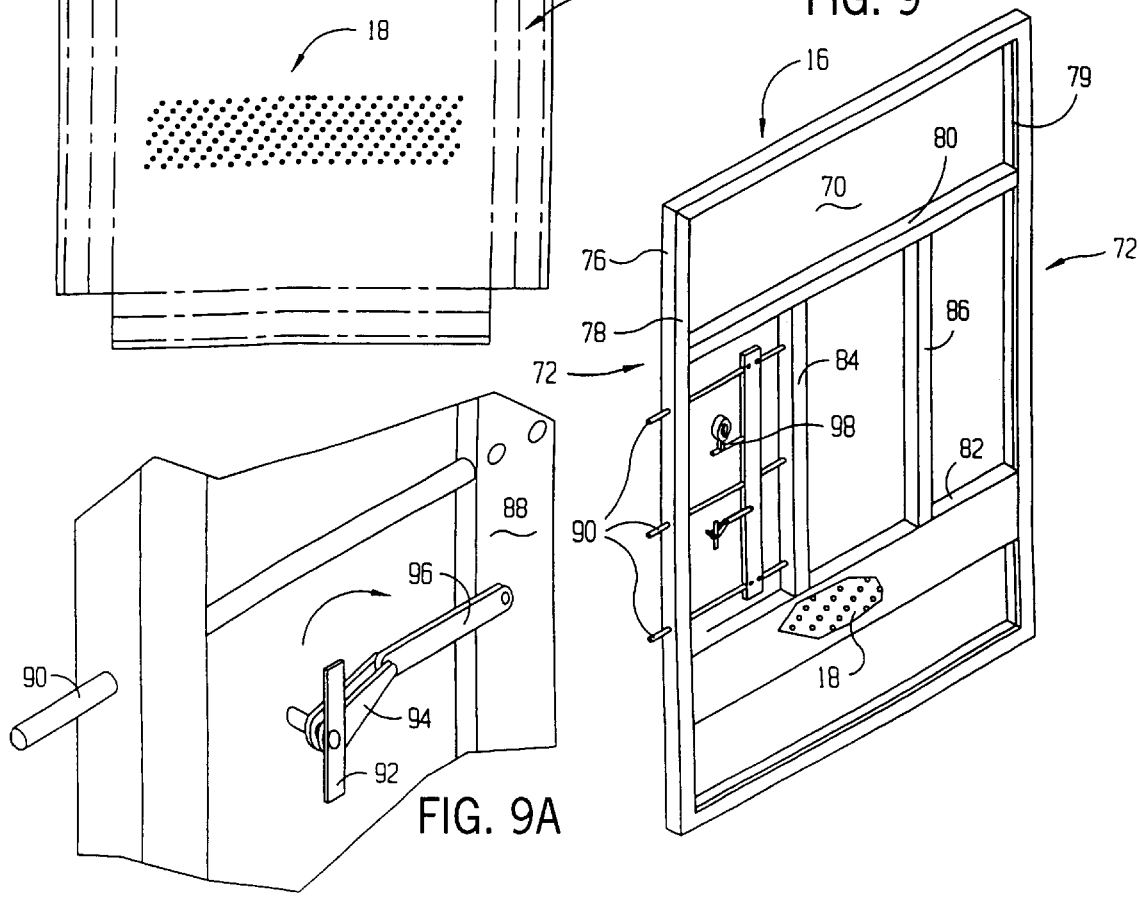
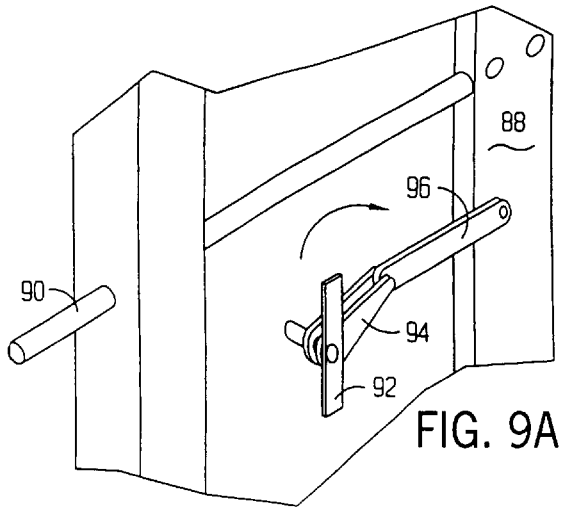

TORNADO SHELTER

FIELD OF INVENTION

This invention is directed to safe rooms or tornado shelters conforming to the "National Performance Criteria for Tornado Shelters," 1st Edition, May 8, 1999, published by the Federal Emergency Management Agency (FEMA), and Booklet #320 entitled "Taking Shelter From The Storm: Building a Safe Room Inside Your House," 2nd Edition, August 1999 also published by Federal Emergency Management Agency (FEMA). The criteria of these publication requires, among other things, that the shelter and components withstand forces imposed by 250 mph ground-level wind speeds and prevent perforation by a 15 lb. 2×4 board traveling at a speed of 100 miles per hour. More particularly, this invention is directed to the problems of design and installation of a storm shelter meeting FEMA criteria and simultaneously being capable of efficient installation within an existing building with minimum costs of components and assembly.

This invention includes a unique door construction for completion of the shelter that is wheel chair accessible, swings inwardly to avoid being blocked by debris and has a simple actuator for a three bolt lock that facilitates operation by children. This door also meets the FEMA criteria of withstanding forces imposed by a 250 mph ground level wind and perforation by a 15 lb. 2×4 board traveling at a speed of 100 miles per hour.

RELATED ART

The problems of installing a vault or safe room facility within an existing building have been previously noted in the art. For example, U.S. Pat. No. 5,813,174 (Waller) recognized that such units often could not be installed without demolishing a major part of a building. For this reason, he disclosed a unit that could be shipped in a compact packaging unit for installation in a building without major modifications to the existing structure. While his concepts have merit, they do require special pre-fabricated "connector sleeves" and "welded plate connectors" which must be welded to connection members. In addition, U.S. Pat. No. 5,813,174 teaches a "light-weight" steel structure and does not disclose a door structure. Importantly, since the door structure has a substantial surface area, its design, in a manner capable of meeting the FEMA guidelines, presents a challenge.

Accordingly, the present invention seeks to eliminate the need for any special pre-fabricated connectors or connections, to use heavy, 10 gauge steel, to utilize standard, off the shelf connectors and to provide a door design that will meet the standards of FEMA.

SUMMARY OF INVENTION

Tis invention comprises a tornado shelter that will meet the performance criteria of FEMA and withstand forces imposed by a 250 mph ground level wind as well as perforation by a 15 lb. 2×4 board traveling at a speed of 100 miles per hour. It includes C-shaped channel members formed of steel and bolted together to define square or rectangular building having a door that is also capable of withstanding the same forces. Importantly, the unit is wheelchair accessible. In addition, its door locking structure reduces the risk of children locking themselves within the structure.

Accordingly, the objectives of this invention are to provide, among other things, 1) A low cost tornado shelter that requires no special prefabricated parts and may be assembled by a home owner within a room of his existing home;
2) A low cost tornado shelter having surface panel members formed to have integral interconnection capabilities and a very high substantial, integral strength;
3) A low cost tornado shelter having a wide, high strength door and assembly that does not impede wheelchair entry, opens inwardly to prevent blockage by storm debris, has a simplistic locking device and is sufficiently strong to meet FEMA criteria;
4) Surface panel members for tornado shelters formed of C-shaped construction providing ease of assembly;
5) A low cost tornado shelter that can be assembled from the inside, i.e., easily assembled within a closet of a home;
6) A low cost tornado shelter that can be disassembled from the inside so as to permit an emergency egress by disassembling any of the individual wall panels;
7) A low cost tornado shelter that does not require a separate, integrated frame structure; and
8) A door and simplified lock system that also meets the FEMA standards and is prefabricated in a manner to facilitate construction of the shelter.

DESCRIPTION OF THE DRAWINGS

The manner in which these objectives and other desirable characteristics can be obtained from this invention is explained in the following specification and attached drawings in which:

FIG. 1 is a perspective view of the preferred embodiment of the shelter as assembled in a home or building;

FIG. 2 is an exploded view of the shelter of FIG. 1;

FIG. 8 is a side elevational view of the door panel prior to being formed into its C-shaped configuration;

FIG. 9 is a perspective view of the door as seen from the inside of the shelter;

FIG. 9a is an exploded view of section of the door of FIG. 9 illustrating the actuation of the pin locks of the shelter; and FIG. 10 is a perspective view of a dead bolt which may be used to lock the unit with key.

DETAILED DESCRIPTION

Figure 3:
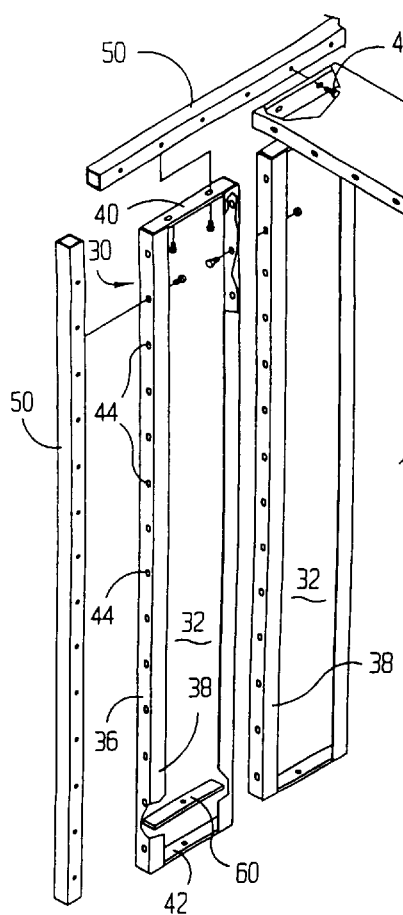
FIG. 3 is a partial exploded view of some of the components of the preferred embodiment of the shelter with sections broken away to demonstrate a method of assembly of the shelter.

A preferred embodiment of the present invention is depicted in one intended environment in FIG. 1 of the drawings. The shelter 10 has a body formed of a top section 12 and four sides 14, one of which includes a door 16 and a door frame assembly 22 with a locking device to be further illustrated. The door 16 may be provided with a series of apertures 18 comprising a lower air vent that works in conjunction with an upper air vent installed in the top section 12 to allow natural cross ventilation within the shelter.

The top section 12 and the four side sections 14 are constructed from very strong, steel panels 30 which are bolted together. These sections are further interconnected by connection bars 50 and strong steel bolts in the manner depicted in FIG. 3. The connection bars 50 connect the sides 12 and top 14 together, but, in an effort to lower cost, they are not joined to one another at their ends, thus eliminating the need for connectors or additional fasteners.

Figure 4:
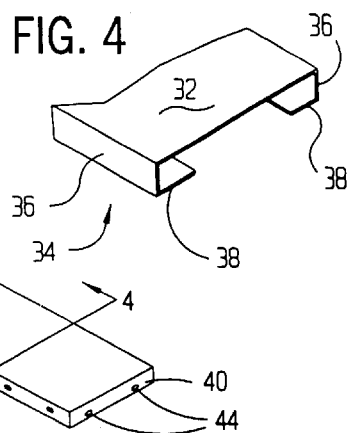
FIG. 4 is a perspective view, in section, of a portion of a panel member taken through the lines 4—4 of FIG. 3.

Preferably, the steel panels 30 are formed of 10 gauge steel. They are formed into their final, high strength shape shown in FIGS. 3 and 4 on a press brake or a roll forming machine. This final, high strength shape includes flat section 32 and a C-section 34 at each side of the panel comprising a web 36 and an inturned flange 38. In addition, each panel 30 is provided with a folded and welded flat section 40 at each end.

Figure 5:
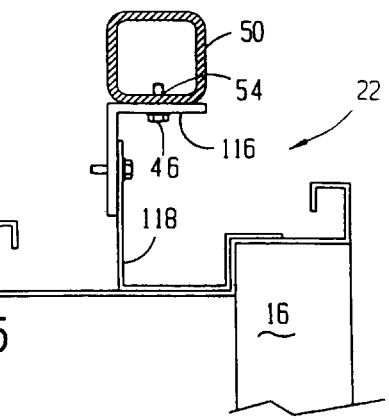
FIG. 5 is a partial plan view of a section of the door and door frame assembly taken through a vertical center line of thereof.

Each of the panels 30 have mating apertures 44 drilled or punched along the entire length of their web 36. Preferably ½ inch grade five bolts 46 are passed through and join adjacent panels together as shown towards the top of the panels 30 as shown in FIG. 5.

The folded sections 40 and 42 at the top and bottom of each panel 30 are also provided with apertures 44. Again, bolts 46 pass through apertures 44 in the folded sections to join each panel 30 to an associated tubular interconnecton member 50 that is provided with regularly spaced threaded apertures 54 on two adjoining sides. These apertures 54 are threaded to receive a ½ inch grade 5 bolt for strength.

Thus, each wall section 14 or top section 12 comprises complete walls that are of high strength resulting from the formed and bolted together C-shaped sections. Each of these sections are joined to one another through an interconnection bar or tube member 50 to define a four sided shelter with a top as shown in FIG. 1.

Figure 7:
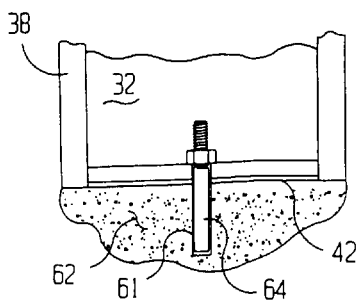
FIG. 7 is a partial side elevational view, in section, illustrating a preferred method of anchoring the unit to a concrete slab.

To insure that the shelter 10 can withstand the 250 mile per hour ground level wind criteria of FEMA, each panel is solidly anchored to a concrete slab 62 as shown in FIG. 7. To obtain a solid anchor, the bottom end of each panel is also provided with a center hole (not shown) and is reinforced with a thick metal bar 60 having a matching aperture through the center thereof. Preferably, this bar 60 is welded to its associated panel 30. Then, apertures 61 are drilled in the concrete slab 62 for receiving an anchor bolt 64. Thereafter, an adhesive (not shown) is placed in the aperture 61 for bonding an anchor bolt 64 to the slab 62. Preferably, these anchor bolts are those manufactured, sold and installed in accord with the instructions of Hilti, Inc. of Tulsa, Okla. under the designation Hilti ½"×6½" HAS Rods A36, #00068667.

With the shelter's side walls 14 and top 12 assembled, the door 16 and its frame assembly 22 can be installed. This door is preferably 36 inches wide. Such a width requires substantial reinforcement structures and locking bolts to withstand the required parameters of FEMA.

This door structure 16 begins with a flat 12 gauge steel panel 70 which is provided with material to form a C-shaped reinforcing perimeter 72 comprised of a web 76, an inturned flange 78 and a return flange 79 that is formed on a press brake. As shown in FIG. 9, the door 16 is also provided with an upper horizontal reinforcing bar 80 and a lower horizontal reinforcing bar 82 which is tall enough to cover the ventilation apertures 18. Openings are formed in the lower section of the lower bar 82 (not shown) to permit cross ventilation of the shelter in conjunction with the upper vent 24. To further strengthen the door, two vertical bars 84 and 86 are spaced apart and welded to the door structure 16 and the steel panel vertical reinforcing bars 84 and 86. Additional bars or angle iron members can be added to further strengthen the door.

An important aspect of the door is an inexpensive triple pin lock unit which is composed of three horizontal sliding locking pins 90, connected together with a synchronizer or actuator bar 88. The sliding member pins 90 are identical and spaced apart to extend through the C-shaped reinforcement 72 of the door 20 and into apertures (not shown) of the door frame assembly 22. The locking pins 90 are further guided by extending through apertures in the door stiffener 84.

This three pin lock can be reciprocated by both an internal and external tee handle 92 which has a central shaft (unnumbered) passing through an aperture in the door panel 70. Rotation of the tee handle 92 and its associated shaft results in rotation of a lever 94 which then reciprocates lock link 96 and synchronizer/actuator lock member 88. This reciprocation moves the locking pins 90 into and out of the locking apertures (not shown) of the door assembly 22. Thus, the invention provides a three bolt lock simplistically operated by a single, centrally located actuator 88.

A security locking device may be provided if the shelter is also to be used as a storage safe for protection of valuables. One low cost locking means is depicted in FIG. 10. It includes a conventional, dead bolt lock 98 having an external key and an internal locking knob for reciprocation of the dead bolt 99 into a recess (unnumbered) of a locking bar 100 which extends from the synchronizer/actuator bar 88.

Figure 6:
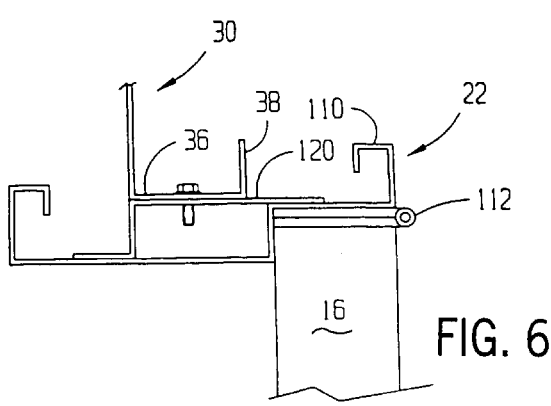
FIG. 6 is a partial side elevational view of the door and door frame assembly taken along a horizontal section line thereof.

To facilitate complete installation of the shelter, the door is mounted to a door frame assembly 22. The details of this assembly are best shown in FIGS. 5 and 6. It includes a primary frame member 110 which extends about the sides and the top of the door 16 and takes the shape depicted in FIGS. 5 and 6. As manufactured, the door 16 is hinged to the primary frame member 110 through a set of three hinges, one of which is depicted at 112 in FIG. 6. As shown, the door 16 is mounted to open into the shelter 10 to avoid blockage of the door by storm debris.

For ease of mounting, the door and its frame assembly are preferably placed inside the area about which the shelter is to be constructed. After the walls are constructed, the unit is stood up right and moved between the wall panels 30 defining the door area. An angle shaped hanger 116 is bolted to the underside of the bar 50 defining the top of the door opening. Then, a connecting bracket 118, preferably in the shape depicted in FIG. 5 and welded or affixed to the primary frame member 110, is affixed to the hanger 116 by bolts as shown.

In addition to the top connection to the bar 50, each side of the door frame assembly 22 is bolted to the adjacent web 36 of the panels 30 on each side of the door opening. Again, a connecting bracket 120 is affixed to the door frame me connecting bracket is provided with drilled and tapped apertures for receiving bolts through the apertures 44 of the web 36 of the panels.

Preferably, the door frame assembly includes a metal floor plate as depicted in FIG. 1 having a thickness of ½ or less so as to facilitate wheel chair access into the shelter. This floor plate is also provided with apertures for anchoring same to the concrete slab 62 in a manner similar to that depicted in FIG. 7. Additional counter sunk apertures with appropriate countersink bolts are used to further secure the metal plate.

Those skilled in the art will appreciate that this invention can be modified in various ways without departing from the true scope of my invention. For example, the door frame assembly 22 can take various forms including that of eliminating the extending flanges for cost purposes. In addition, various strengthening bends or folds might be placed in the panels 30. In some instances, buyers may desire to finish the shelter by applying paint, particle board or other surface treatments. In addition, others may desire to incorporate integral storage to the device. These and similar modifications are within the scope of my development.

I claim:

1. A low cost tornado shelter capable of being installed in an existing building for protecting occupants against building collapse and flying objects without the requirement of a separate frame assembly, said shelter comprising:
    a) connection members not being fastened to one another at their ends and having threaded apertures on two adjacent sides for affixing reinforced panels thereto;
    b) a plurality of reinforced panels defining elongated C-shaped channel members with closed ends, the channels of said members having apertures for bolting the members one to another and said closed ends having apertures for being bolted to the connection members or to a floor in said building without the necessity of first constructing a shelter frame assembly;
    c) threaded bolts for joining the C-shaped channel members to each other, to the connection members and to the floor to define a shelter housing with a door opening, said bolts being inserted from the interior of said shelter to facilitate assembly within said existing building structure and to provide emergency disassembly and egress; and
    d) a reinforced door formed of sheets having C-shaped channels on its sides and being swingably mounted to said shelter.

2. An apparatus as recited in claim 1 in which all of the apertures for inserting the bolts are accessible from the inside of said shelter to permit same to be assembled within a confined space.

3. An apparatus as recited in claim 1 in which said at least one closed end of said channel members have a reinforcing plate welded there to for providing additional strength for affixing said members to a floor of said building.

4. An apparatus as recited in claim 2 in which the threaded bolts for joining said channel members to the floor comprise anchor bolts.

5. An apparatus as recited in claim 1 in which said door is provided with a three bolt locking device for locking said door in a closed position.

6. A low cost tornado shelter capable of being installed in an existing building for protecting occupants against building collapse and flying objects, said shelter comprising:
    a) connection members not being fastened to one another at their ends and having threaded apertures on two adjacent sides for affixing reinforced panels thereto;
    b) a plurality of reinforced panels defining elongated C-shaped channel members with closed ends, the channels of said members having apertures for bolting the members one to another and said closed ends having apertures for being bolted to the connection members or to a floor in said building;
    c) threaded bolts for joining the C-shaped channel members to each other and to the floor to define a shelter housing with a door opening; and
    d) a reinforced door affixed to said shelter for opening inward to avoid blockage by debris, said door being formed of sheets having C-shaped channels on its sides and being swingably mounted to said shelter.

7. The low-cost tornado shelter according to claim 6, wherein said reinforced door includes reinforcing members welded to an interior side of said door, a vertically positioned locking member carrying three pin bolts adapted to be reciprocated horizontally to lock the door to an associated shelter and a keyed dead bolt lock mounted on the door and adapted to lock the vertically positioned locking member and pins in the locked position.

* * * * *